United States Patent [19]
Alpert et al.

[11] Patent Number: 5,621,886
[45] Date of Patent: Apr. 15, 1997

[54] METHOD AND APPARATUS FOR PROVIDING EFFICIENT SOFTWARE DEBUGGING

[75] Inventors: Donald Alpert, Santa Clara; Gary Hammond, Campbell, both of Calif.

[73] Assignee: Intel Corporation, Santa Clara, Calif.

[21] Appl. No.: 492,293

[22] Filed: Jun. 19, 1995

[51] Int. Cl.$^6$ .................................................. G06F 11/00
[52] U.S. Cl. .................. 395/183.14; 395/568; 395/591; 364/267; 364/267.91; 364/275.5; 364/DIG. 1
[58] Field of Search .................... 395/183.14, 183.21, 395/183.01, 183.06, 183.07, 183.11, 183.22, 375; 364/275.5, 267, 267.91, DIG. 1

[56] References Cited

U.S. PATENT DOCUMENTS

| | | | |
|---|---|---|---|
| 4,176,394 | 11/1979 | Kaminski et al. | 364/200 |
| 4,179,734 | 12/1979 | O'Leary | 364/200 |
| 4,279,016 | 7/1981 | Leininger et al. | 364/200 |
| 4,306,287 | 12/1981 | Huang | 364/200 |
| 4,403,284 | 9/1983 | Sacarisen et al. | 364/200 |
| 4,409,654 | 10/1983 | Wada et al. | 364/200 |
| 4,488,227 | 12/1984 | Miu et al. | 364/200 |
| 4,598,364 | 7/1986 | Gum et al. | 364/300 |
| 4,709,324 | 11/1987 | Kloker | 364/200 |
| 4,725,947 | 2/1988 | Shonai et al. | 364/200 |
| 4,755,997 | 7/1988 | Takahashi | 371/19 |
| 4,783,731 | 11/1988 | Miyazaki et al. | 364/200 |
| 4,924,382 | 5/1990 | Shouda | 364/200 |
| 5,095,426 | 3/1992 | Senta | 395/375 |
| 5,197,138 | 3/1993 | Hobbs et al. | 395/375 |
| 5,237,666 | 8/1993 | Suzuki et al. | 395/375 |
| 5,249,278 | 9/1993 | Krauskopf | 934/115 |
| 5,265,213 | 11/1993 | Weiser et al. | 395/375 |
| 5,319,763 | 6/1994 | Ho et al. | 395/425 |
| 5,341,500 | 8/1994 | Moyer et al. | 395/725 |
| 5,361,348 | 11/1994 | Nakamoto | 395/575 |
| 5,367,550 | 11/1994 | Ishida | 371/19 |
| 5,371,894 | 12/1994 | Di Brino | 395/800 |
| 5,379,301 | 1/1995 | Sato et al. | 371/19 |
| 5,386,519 | 1/1995 | Nakamura et al. | 395/375 |
| 5,448,705 | 9/1995 | Nguyen et al. | 395/375 |
| 5,493,664 | 2/1996 | Doi | 395/427 |
| 5,530,804 | 6/1996 | Edgington et al. | 395/183.06 |
| 5,533,192 | 7/1996 | Hawley et al. | 395/183.04 |
| 5,564,028 | 10/1996 | Swoboda et al. | 395/375 |

OTHER PUBLICATIONS

Pentium™ Processor User's Manual, vol. 3: Architecture and Programming Manual, Intel Corporation 1994, pp. 14-1-14-27 and 17-1-17-9.

Intel 80960KB Programmer's Reference Manual, Intel Corporation 1988, pp. 10-1-10-8.

Primary Examiner—Robert W. Beausoliel, Jr.
Assistant Examiner—Dieu-Minh Le
Attorney, Agent, or Firm—Blakely, Sokoloff, Taylor & Zafman

[57] ABSTRACT

A method and apparatus for the separate enablement of debug events during the execution of operating system routines and non-operating system routines. According to one aspect of the invention, a processor is described which may operate in a first mode and a second mode. While operating in the first mode, the processor allows for access to additional resources which are not available in the second mode. The processor generally includes a first storage area, a circuit, and debug circuitry. The first storage area has stored therein a first indication. This first indication indicates which mode the processor is currently operating in. The circuit has stored therein a second indication and a third indication. The second indication indicates whether a debug event is to be recognized while the processor is operating in the first mode. The third indication indicates whether the debug event is to be recognized while the processor is operating in the second mode. The debug circuitry is coupled to the first storage area to receive the first indication. The debug circuitry is also coupled to the circuit to receive either the second indication or the third indication based on the state of the first indication. The debug circuitry allows for the recognition of the debug event based on the state of the indication it receives from the circuit.

34 Claims, 4 Drawing Sheets

METHOD AND APPARATUS FOR PROVIDING EFFICIENT SOFTWARE DEBUGGING

CROSS-REFERENCE TO RELATED APPLICATION

Ser. No. 08/438,474, titled "A Method and Apparatus for Providing Breakpoints on a Selectable Address Range," filed May 10, 1995, by Gary N. Hammond and Donald Alpert.

Ser. No. 08/454,087, titled "A Method and Apparatus for Providing Breakpoints on Jumps and Software Profiling in a Computer System," filed May 30, 1995, by Gary N. Hammond and Donald Alpert.

Ser. No 08/492,366, titled "A Method And Apparatus For Performing Single Stepping Using Address Breakpoints And Branch Breakpoints," filed Jun. 19, 1995, by Gary N. Hammond and Donald Alpert.

BACKGROUND OF THE INVENTION

1. Field of the Invention

The invention relates to the field of computer systems. More specifically, the invention relates to software debugging.

2. Background Information

Software debugging is the detecting, locating, and correcting of logical and/or syntactical errors in a computer program. Debug hardware is often included in a processor for use by a software debug program. Typically, the debug program uses the debug hardware to allow the programmer to examine data and check conditions during the execution of another computer program. Thus, the debugging features of a processor provide programmers with valuable tools for looking at the dynamic state of the processor.

A typical debug feature, when enabled, reports a debug event in response to a certain condition(s) being met. The term "event" is used herein to refer to any action or occurrence to which a computer system might respond (e.g., hardware interrupts, software interrupts, exceptions, faults, traps, aborts, machine checks, debug events). Upon recognizing an event, a processor's event handling mechanism causes the processor to interrupt execution of the current process, store the interrupted process' execution environment (i.e., the information necessary to resume execution of the interrupted process), and invokes the appropriate operating system handler. Upon completing the servicing of the event, the invoked handler instructs the processor to resume execution of the interrupted process using the previously stored execution environment. The appropriate handler for debug events is the debug handler. Thus, in response to each debug event, the debug handler is executed. The debug handler is a portion of the debug program and it allows the programmer to perform a variety of debugging techniques. When the programmer is finished, the programmer can cause the debug handler to instruct the processor to resume the interrupted process using the process' previously stored execution environment. Several different debug events may be serviced by a single handler.

One processor which includes debugging hardware is the Intel® 80960KB manufactured by Intel Corporation of Santa Clara, Calif. The 80960KB provides several debugging modes, including a "branch-trace mode" and an "instruction-trace mode." When the instruction-trace mode is enabled, the processor generates an instruction-trace event each time an instruction is executed. Debug software can use the instruction-trace mode to "single-step" the processor—i.e., interrupt execution after each instruction to allow the debug software to perform various debug techniques. When the branch-trace mode is enabled, the processor generates a branch-trace event each time an instruction that causes a branch (also termed as a "jump") to be taken is executed. An instruction that causes a branch to be taken is one that causes the processor to transfer flow of execution to another instruction (e.g., a jump instruction, a branch instruction, etc.). A taken branch typically transfers the flow of execution in a non-sequential manner—i.e., to an instruction which does not sequentially follow the instruction causing the branch to be taken. A branch-trace event is not generated for conditional-branch instructions that do not result in a branch being taken.

A register on the 80960 processor is used to store "trace controls" (flags for selecting between the different trace modes). This register also stores a trace-enable flag for enabling the trace modes selected by the trace controls. Typically, software selects the traces modes to be used through the trace controls and then sets the trace-enable flag when tracing is to be used. Upon recognizing an event, the processor interrupts execution of the current process, stores the interrupted process' execution environment (including the state of the trace-enable flag), disables the trace modes by clearing the trace-enable flag, and invokes the appropriate operating system handler. Upon completing the servicing of the event, the invoked handler instructs the processor to resume execution of the interrupted process using the previously stored execution environment (including the previous state of the trace-enable flag). Thus, the processor disables tracing during the execution of operating system routines which are called by the processor's event handling mechanism. As a result, the debug modes cannot be used to debug operating system routines as they are invoked by the event handling mechanism of the processor. Another limitation of the 80960KB processor is that is does not support address breakpoints.

Another processor which includes debugging hardware is the Intel Pentium® processor manufactured by Intel Corporation. The Pentium processor includes several debugging features, including a "single-step trap" and "address breakpoints." When enabled, a single-step trap occurs after the execution of the current instruction. Debug software can use the single-step trap to single step the processor. One limitation of this processor is that the INT instructions clear the TF flag. Therefore, software debuggers which single-step code must include complex algorithms to recognize and emulate INT n or INTO instructions rather than executing them directly. Due to this required emulation, the inclusion of new instructions may require the software debuggers to be rewritten. Another limitation of this processor is that additional circuitry had to be included to reconcile the single-step trap with the other events. This circuitry terminates single stepping if an external interrupt occurs. In addition, when both an external interrupt and a single-step interrupt occur together, this circuitry clears the TF flag, saves the return address or switches tasks, and examines the external interrupt input before the first instruction of the single-step handler executes. If the external interrupt is still pending, then it is serviced—i.e., that external interrupt's handler is executed. During the execution of the external interrupt's handler, the single-step trap is disabled. Upon completion of the external interrupt's handler, the processor returns to executing the single-step handler. Thus, operating system routines (such as the external interrupt handlers) are not normally run in single step mode. To run operating system routines in the single step mode, a INTn instruction which calls an interrupt handler must be single stepped. As a result, this processor does not allow single stepping to be enabled on operating system routines as they interact with other programs.

As previously stated, the Pentium processor also supports address breakpoints. The Pentium microprocessor includes 4 address breakpoint registers, each capable of storing the linear address of a breakpoint (i.e., the address of a memory or I/O location). Each of these breakpoint registers has two corresponding enable bits—a local enable bit and a global enable bit. These enable bits are used to enable and disable recognition of address breakpoints in relation to task switches. Task switching, also commonly referred to as multitasking, is the allocation of processing time between different programs executing on the processor. A task switch is like a procedure call, but it saves more processor state information. The Pentium processor supports both hardware task switching (also termed as protected-mode multitasking) and software task switching. Hardware task switches are performed by special hardware on the Pentium processor which stores nearly all of the processor's registers (e.g., the instruction pointer, status registers, general purpose registers, etc.) in memory. The local enable bits are automatically cleared by the processor with every hardware task switch to avoid unwanted breakpoint conditions in other tasks. In contrast, the global enable bits are not cleared by a hardware task switch. One limitation of hardware task switching is that it requires microcode.

Future processors may not include microcode. Another limitation of hardware task switching is that it saves nearly all the processor's registers, whether or not they need to be saved. This unnecessary saving of information degrades the processor's performance.

In contrast, a software task switch is one in which the hardware on the processor stores the minimum information necessary (e.g., the instruction pointer and some status registers) to resume the previous task and the software determines whether it is necessary to store the rest. Software task switches can be used to optimize performance by allowing smaller processor states to be saved. For a further description of the Pentium processor see: *Pentium Processor's Users Manual Users Manual-Volume 3: Architecture and Programming Manual*, 1994, available from Intel Corporation of Santa Clara, Calif. A limitation of the Pentium microprocessor is that neither the local enable bits nor the global enable bits are cleared by software task switches. As a result, recognition of an address breakpoint is either enabled or disabled during execution of both applications and invoked operating system routines when software tasks switches are used. For example, a programmer could not enable recognition of an address breakpoint only during the execution of operating system handlers. To recognize an address breakpoint, comparing circuitry (typically a comparator) is used. Since the Pentium processor is superscalar (i.e., it allows for the execution of multiple instructions per clock cycle, each instruction being executed by a separate pipeline), an address breakpoint could be generated by the execution of any one of the instructions. To avoid the inclusion of comparing circuitry in every pipeline, the Pentium processor operates in a scalar mode (i.e., using only one pipeline—executing only one instruction per clock cycle) while address breakpoints are enabled. Thus, the Pentium processor trades cost and complexity for a degradation in performance when using address breakpoints.

Typically, programmers are debugging either an application or an operating system. However, when address breakpoints are enabled and software task switches are used, recognition of address breakpoint events is enabled and the processor operates in the scalar mode during the execution of both applications and the operating system. As a result, the Pentium is unnecessarily degraded when using address breakpoints. This is especially problematic when debugging software on a multi-user system. Another limitation of the Pentium processor is that it does not support branch breakpoints.

SUMMARY

A method and apparatus for the separate enablement of debug events during the execution of operating system routines and non-operating system routines is provided. According to one aspect of the invention, a processor is described which may operate in a first mode and a second mode. While operating in the first mode, the processor allows for access to additional resources which are not available in the second mode. The processor generally includes a first storage area, a circuit, and debug circuitry. The first storage area has stored therein a first indication. This first indication indicates which mode the processor is currently operating in. The circuit has stored therein a second indication and a third indication. The second indication indicates whether a debug event is to be recognized while the processor is operating in the first mode. The third indication indicates whether the debug event is to be recognized while the processor is operating in the second mode. The debug circuitry is coupled to the first storage area to receive the first indication. The debug circuitry is also coupled to the circuit to receive either the second indication or the third indication based on the state of the first indication. The debug circuitry allows for the recognition of the debug event based on the state of the indication it receives from the circuit.

BRIEF DESCRIPTION OF THE DRAWINGS

The invention may best be understood by referring to the following description and accompanying drawings which illustrate the invention, In the drawings.

DETAILED DESCRIPTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention. It is worthwhile to note that addresses are represented in hexadecimal form unless otherwise specified.

This document describes an invention allowing for the separate enablement of debug events during the execution of operating system routines and non-operating system routines. This allows programmers the flexibility of selectively enabling debug events during the execution of either handlers, or applications, or both. In addition, this document describes a processor supporting both branch breakpoint events and address breakpoint events. In addition, this document describes a method for using branch breakpoint events and address breakpoint events to provide for single stepping.

One Embodiment of the Invention

Figure 1:
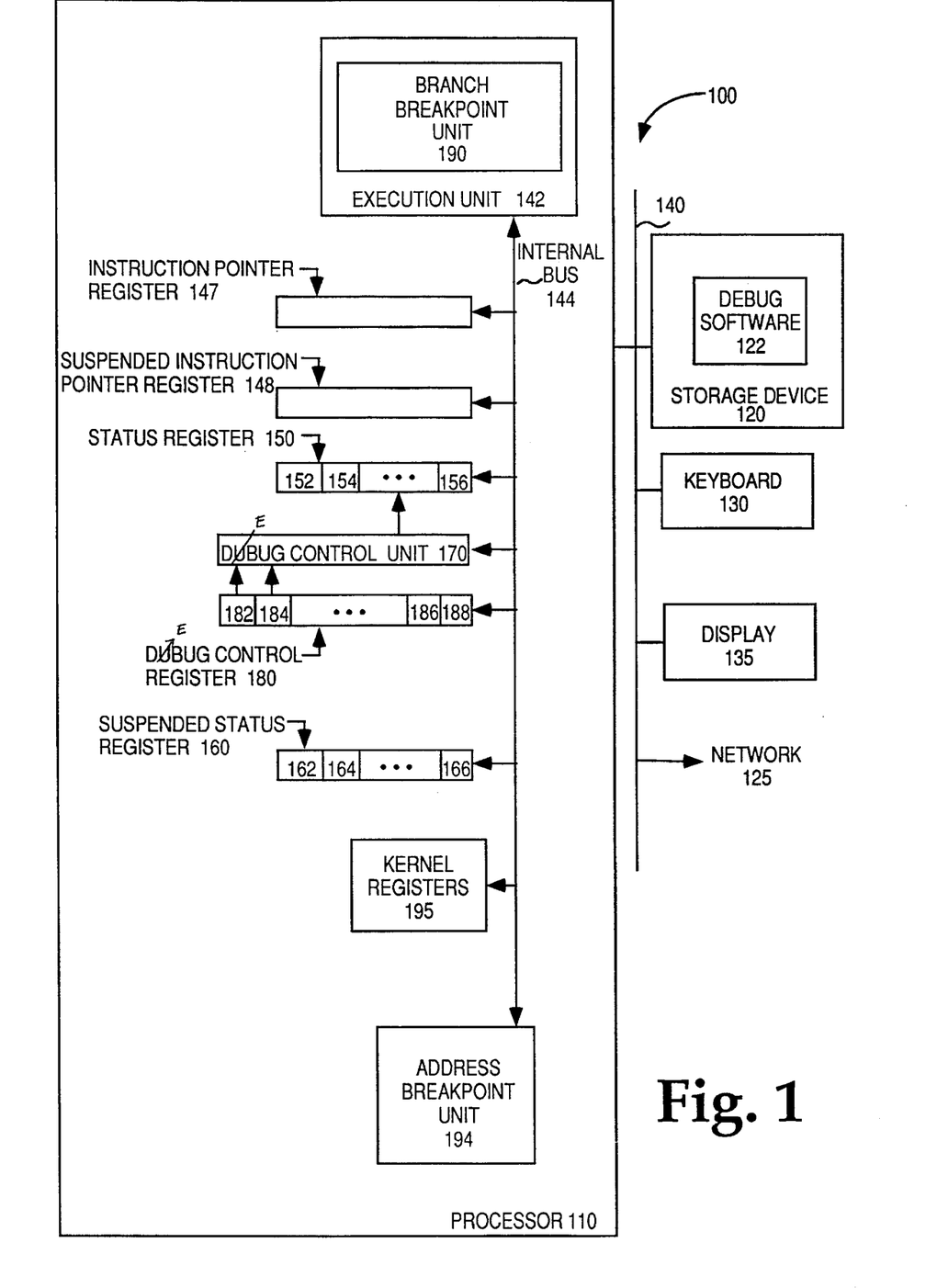
FIG. 1 shows a block diagram illustrating an exemplary computer system 100 incorporating the teachings of the invention.

FIG. 1 shows a block diagram illustrating an exemplary computer system 100 incorporating the teachings of the invention. The exemplary computer system includes a processor 110, a storage device 120, a network 125, and a bus 140. Processor 110 is coupled to storage device 120 and network 125 by bus 140. In addition, a number of user input/output devices, such as a keyboard 130 and a display 135, are also coupled to bus 140. Processor 110 represents a central processing unit of any type of architecture, such as a CISC, RISC, VLIW, or hybrid type architecture. In addition, processor 110 could be implemented on one or more chips. Furthermore, processor 110 could be implemented as a scalar or superscalar processor. Storage device 120 represents one or more mechanisms for storing data. For example, storage device 120 may include read only memory (ROM), random access memory (RAM), magnetic disk storage mediums, optical storage mediums, and/or flash memory devices. While this embodiment is described in relation to a single processor computer system, the invention could be implemented in a multiprocessor computer system. In addition, while this embodiment is described in relation to a 64-bit computer system, the invention is not limited to a 64-bit computer system.

FIG. 1 also illustrates that storage device 120 has stored therein debug software (not shown) 122 for execution on processor 110 to provide for the debugging of other software. Of course, storage device 120 preferably contains additional software which is not necessary to understanding the invention.

FIG. 1 additionally illustrates that processor 110 includes an execution unit 142, instruction pointer register 147, suspended instruction pointer register 148, status register 150, suspended status register 160, control unit 170, debug control register 180, and internal bus 144. Of course, processor 110 contains additional circuitry which is not necessary to understanding the invention.

Internal bus 144 couples the elements of processor 110 together. Execution unit 142 is used for executing instructions. Instruction pointer register 147 is used for storing an address of an instruction currently being executed by execution unit 142. Status register 150 is used for storing status information concerning the process currently executing on execution unit 142. The contents of instruction pointer register 147 and status register 150 make up the execution environment of the process currently executing on processor 110. Suspended instruction pointer register 148 and suspended status register 160 are used for temporarily storing the execution environment of a process whose execution is suspended in response to an event. However, alternative embodiments could use any number of techniques for temporarily storing the execution of environment of a suspended process. For example, see Shanley, Tom and Anderson, Don, *ISA System Configuration*, MindShare, Inc. (1993).

Processor 110 is operable in two modes; a kernel mode (also termed as the "system mode" or "privileged mode") and a user mode (also termed as the "application mode"). The system mode is used for executing operating system type code (e.g., events handlers), while the user mode is used for execution non-operating system type code (e.g., applications). Operating system code is software responsible for controlling the allocation and usage of hardware resources such as memory, processor time (e.g., multitasking), disk space, peripheral devices, etc. The operating system is the foundation on which application, such as word-processing and spreadsheet programs, are built. The kernel mode provides additional resources not available in the user mode. In one embodiment, for example, access to additional storage areas (e.g., kernel registers 195), execution of additional instructions (sometimes referred to as "privileged instructions"), and manipulation of critical components of the system (e.g., memory, input/output ports, etc.) is provided for only in the kernel mode. Thus, these additional resources are protected from use while the processor is in the user mode. In one embodiment, these additional resources include suspended instruction pointer register 148, status register 150, suspended status register 160, debug control register 180, and kernel registers 195. These modes of operation of processor 110 are also termed as "privilege levels." The selection between the different mode of processor 110 is performed by mode indication 156 stored in status register 150.

Processor 110 also contains debug circuitry, including a branch breakpoint unit 190 and an address breakpoint unit 194. Status register 150 includes an enable bit 152 and an enable bit 154 for enabling branch breakpoint unit 190 and address breakpoint unit 194, respectively. When enable bit 152 indicates an enable state, branch breakpoint unit 190 is enabled. In contrast, when enable bit 152 indicates a disable state, branch breakpoint unit 190 is disabled. Similarly, when enable bit 154 indicates an enable state, address breakpoint unit 194 is enabled. In contrast, when enable bit 154 indicates a disable state, address breakpoint unit 194 is disabled. While one embodiment is described in which bits in registers on processor 110 are used for storing indications (e.g., enable bit 152), alternative embodiments could use any number of techniques. For example, alternative embodiments could store these indications off chip (e.g., in storage device 120) and/or could use multiple bits for each indication.

Branch breakpoint unit 190 is included in execution unit 142. Branch breakpoint unit 190 includes circuitry for detecting whether an instruction currently being executed by the processor is causing a branch (also termed as a "jump") to be taken. An instruction that causes a branch to be taken is one that causes the processor to transfer flow of execution to another instruction (e.g., a jump instruction, a branch instruction, etc.). A taken branch typically transfers the flow of execution in a nonsequential manner—i.e., to an instruction which does not sequentially follow the instruction causing the branch to be taken. A branch breakpoint event is not generated for conditional-branch instructions that do not result in a branch being taken. While enable bit 152 indicates the enable state, branch breakpoint unit 190 transmits a signal each time it detects a branch is or will be taken. Upon receiving this signal from branch breakpoint unit 190, execution unit 142 recognizes a branch breakpoint event (also termed as a "break on jump event"). For a further description of an embodiment of branch breakpoint unit 190, see "A Method and Apparatus for Providing Breakpoints on Jumps and Software Profiling in a Computer System," filed on May 30, 1995, Ser. No. 08/454,087. Processor 110 may also include a storage area for storing the source address of a taken jump as described in the above referenced document.

Address breakpoint unit 194 is used for allowing address breakpoints. In one embodiment, address breakpoint unit 194 includes a number of address breakpoint registers and a corresponding number of breakpoint mask registers. Each address breakpoint register is used for storing a breakpoint address, while each of the breakpoint mask registers are used for storing a mask. Each breakpoint address and its corresponding breakpoint mask define an address range. Address breakpoint unit 194 also includes circuitry coupled to the address breakpoint registers and the breakpoint mask registers. In response to receiving designated addresses from internal bus 144, this circuitry determines whether these addresses are within any of the address ranges defined by the information in the address breakpoint registers and the breakpoint mask registers. This embodiment of address breakpoint unit 194 includes additional circuitry which is not necessary to understanding the invention. For a further description of this embodiment of address breakpoint unit 194, see "A Method and Apparatus for Providing Breakpoints on a Selectable Address Range," filed on May 10, 1995, Ser. No. 08/438,474. While this embodiment is described in relation to using addresses and masks to define address ranges, alternative embodiments could use any number of techniques. For example, an alternative embodiment could store a starting address and an ending address to define an address range. As another example, an alternative embodiment could store address ranges in a similar fashion to the Intel Pentium microprocessor manufactured by Intel Corporation of Santa Clara, Calif. For a further description of the Pentium processor see: *Pentium Processor's Users Manual-Volume 3: Architecture and Programming Manual*, 1994, available from Intel Corporation of Santa Clara, Calif.

Debug control register 180 is used for storing control information for branch breakpoint unit 190 and address breakpoint unit 194. In one embodiment, debug control register 180 contains a type indication corresponding to each address range identified by the breakpoint address registers and the breakpoint mask registers. This type indication is used for specifying whether its corresponding address range is an instruction address breakpoint range or a data address breakpoint range. In one embodiment, the type indication comprises several bits and can further identify the following type of breakpoints: 1) an instruction address breakpoint; 2) a data write address breakpoint; 3) an I/O access breakpoint; or 3) a data read or write address breakpoint. Debug control register 180 is shown containing type bits 186 representing the type indications for the address ranges defined by breakpoint address registers and the breakpoint mask registers.

Debug control register 180 also contains an enable indication for each address range identified by the contents of the breakpoint address registers and the breakpoint mask registers. Each enable indication specifies whether its corresponding address range is currently enabled. Debug control register 180 is shown containing enable bits 188 representing the enable indications for the address ranges defined by breakpoint address registers and the breakpoint mask registers.

Upon receiving an address, address breakpoint unit 194 transmits a signal to execution unit 142 each time: 1) the address is identified by one or more of the address ranges stored in the address breakpoint registers and the breakpoint mask registers; 2) at least one of the address ranges within which the address falls is enabled (the appropriate enable indication(s) in debug control register 180 indicate the enable state—e.g., enable bits 188); 3) at least one of the address ranges within which the address falls is of the same type as the address (the appropriate type indications in debug control register 180 indicate the appropriate type— e.g., type bits 186); and 4) address breakpoint unit 194 is enabled (enable bit 154 indicates the enable state). Upon receiving this signal from address breakpoint unit 194, execution unit 142 recognizes an address breakpoint event.

While one embodiment is described in relation to the use of circuitry for debugging, it is understood that some or all of this circuitry could be implemented in software.

Separate Enablement of Debug Events

Figure 2:
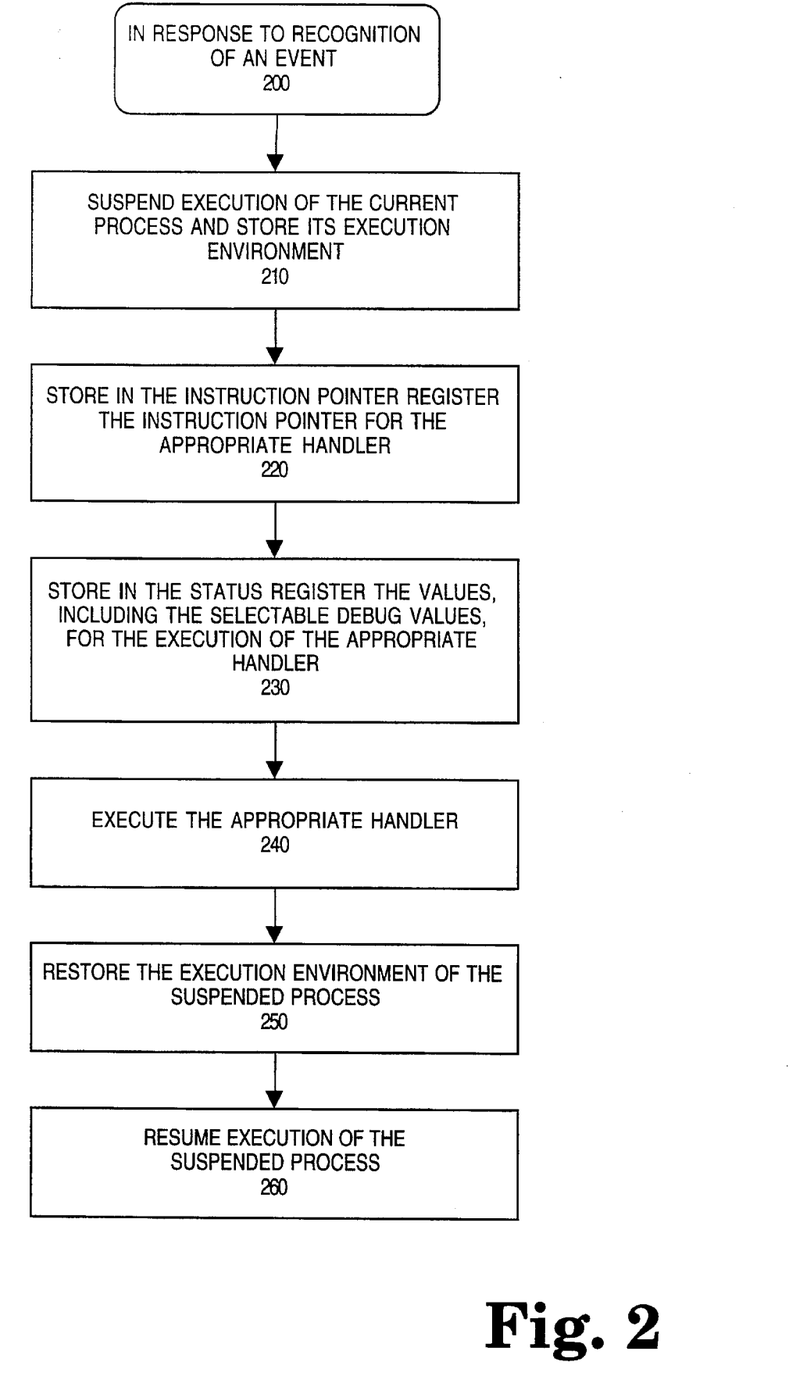
FIG. 2 illustrates a flow diagram of the operation of the processor in FIG. 1.

FIG. 2 shows a flow diagram illustrating the operation of the processor in FIG. 1 in response to each recognized event (including branch breakpoint events and address breakpoint events). As shown in step 200, an event is recognized. From step 200, flow passes to step 210.

As shown in step 210, the execution of the current process is suspended and its execution environment is stored. From step 210, flow passes to step 220. In the described embodiment, processor 110 stores the current process' execution environment by copying the contents of instruction pointer register 147 and status register 150 into suspended instruction pointer register 148 and suspended status register 160, respectively. Enable bit 162 and enable bit 164 in suspended status register 160 correspond to enable bit 152 and enable bit 154, respectively. Since the contents of status register 150 are copied into suspended status register 160, enable bit 162 and enable bit 164 are altered to match the states of enable bit 152 and enable bit 154. In this manner, the enablement states of branch breakpoint unit 190 and address breakpoint unit 194 used by the suspended process are preserved. In the same manner, mode indication 166 in suspended status register 160 corresponds to mode indication 156. Thus, the mode of operation used by the suspended process is preserved.

At step 220, the instruction pointer for the appropriate handler is stored in instruction pointer register 147 and flow passes to step 230. In one embodiment, the debug handler is a generic handler which services multiple events, including branch breakpoint events and address breakpoint events. Thus, for both branch breakpoint events and address breakpoint events, the instruction pointer of this debug handler is loaded into instruction pointer register 147.

As shown in step 230, the status register is loaded with the appropriate values for the execution of the appropriate handler and flow passes to step 240. In the embodiment shown in FIG. 1, execution unit 142 transmits a signal to control unit 170 in response to recognizing a debug event. In response to this signal, control unit 170 loads status register 150 with the appropriate values for the execution of the appropriate handler (referred to herein as "handler information"). The bits of this handler information which correspond to enable bit 152 and enable bit 154 are acquired respectively from an enable bit 182 and enable bit 184 stored in debug control register 180. Thus, control unit 170 alters the states of enable bit 152 and enable bit 154 in status register 150 to the states of enable bit 182 and enable bit 184 in debug control register 180. In this manner, enablement of the debug events may be separately selected for the kernel mode and the user mode—i.e., enablement of the debug events are selected for the kernel mode by altering the states of enable bit 182 and enable bit 184. In addition, the control unit causes the processor to switch to operating in the kernel mode by altering the state of mode indication 156. Thus, the processor stores at least the information necessary to allow for a software task switch.

As shown in step 240, the appropriate handler is executed. Upon completion of the handler, flow passes to step 250. As previously described, in one embodiment the handler for debug events is a generic handler which services multiple events, including address breakpoint events and branch breakpoint events. The debug event handler knows which event has occurred by inspecting an event status register located on processor 110. The event status register stores a number of bits which indicate which event has occurred—e.g., when an event occurs (such as a branch breakpoint event), the state of these bits is altered to indicate which event has occurred. If an address range breakpoint event has occurred, the event status register will indicate which of the address range breakpoints matched. Typically, the last instruction of a handler to be executed instructs the processor to resume the suspended process.

At step 250, the execution environment of the suspended process is restored and execution of the suspended process is resumed. From step 250, flow passes to step 260. In the described embodiment, the execution environment of the suspended process is restored by copying the execution environment stored in suspended instruction pointer register 148 and suspended status register 160 into instruction pointer register 147 and status register 150, respectively. As a result, enable bit 152 and enable bit 154 are restored to their states prior to the event—i.e., the states used by the suspended process. In addition, the state of mode indication 156 is restored to its state prior to the event. Thus, if the suspended process was executing in the user mode, restoring the execution environment of the suspended process causes the processor to switch to operating in the user mode by altering the state of mode indication 156.

At step 260, the flow diagram ends with the processor continuing execution of the suspended process.

In this manner, indications are provided that allow the programmer to selectively enable debug events during the execution of handlers in the kernel mode (e.g., enable bit 182 and enable bit 184), and separate indications are provided that allow the programmer to selectively enable debug events during the execution of other software (e.g., applications)in the user mode. As a result, the programmer is allowed the flexibility of selectively enabling debug events during the execution of either handlers, applications, or both.

Since address range breakpoints may be set such that they only cover address ranges which are of interest to the programmer, unnecessary address range breakpoints typically will not occur during the execution of code which is not of interest to the programmer. However, branch breakpoints occur whenever a branch is taken and recognition of branch breakpoints is enabled. As a result, if branch breakpoints are enabled and branches are taken in code that is not of interest to the programmer, unnecessary branch breakpoints will be recognized and serviced. The recognition and servicing of these unnecessary branch breakpoints degrades performance of the system. In addition, in one embodiment, processor 110 is a superscalar processor which operates in a scalar mode when recognition of either address breakpoints or branch breakpoints is enabled. As previously described, operating in the scalar mode degrades performance of the processor. Thus, even though recognition of address range breakpoints typically will not occur during the execution of code which is not of interest to the programmer, operating in the scalar mode during the execution of code which is not of interest to the programmer unnecessarily degrades performance. Thus, allowing these debug breakpoints to be disabled when they are not needed improves system performance.

For example, an application programmer is often only interested in debugging a particular application. As a result, branch breakpoints and address breakpoints are not of interest to the application programmer during the execution of handlers. Thus, an application programmer can improve performance during the debugging of an application by causing the operating system to alter the states of the enable bits such that recognition of debug events is enabled during the execution of applications and disabled during the execution of handlers. To accomplish this, the application programmer would run a debug program which causes the processor to: 1) switch to the kernel mode; 2) store enable bit 162 and/or enable bit 164 in the enable state; 3) store enable bit 182 and enable bit 184 in the disable state; and 4) switch back to the user mode. By storing enable bit 162 and/or enable bit 164 in the enable state and causing the processor to switch back to the user mode, the states of enable bit 152 and enable bit 154 are selected for the user mode (see step 250 of FIG. 2). The programmer would then instruct the processor to execute an application program to be debugged. Since enable bit 152 and/or enable bit 154 are stored in the enable state, the selected debug event(s) are recognized during the execution of the application in the user mode. However, since enable bit 182 and enable bit 184 are stored in the disable state, debug events are not recognized during the execution of handlers in the kernel mode. In this manner, the performance of debugging applications is improved by avoiding the unnecessary recognition and servicing of branch breakpoint events during the execution of handlers, such as the debug handler. In addition, performance is improved by allowing the processor to execute the handlers in the superscalar mode.

In contrast, a system programmer can improve performance during the debugging of handlers by causing the operating system to alter the states of the enable bits to cause recognition of debug events to be enabled during the execution of handlers and disabled during the execution of applications. To accomplish this, the system programmer would run a debug program which causes the processor to: 1) switch to the kernel mode; 2) store enable bit 162 and enable bit 164 in the disable state; 3) store enable bit 182 and/or enable bit 184 in the enable state; and 4) switch back to the user mode. By storing enable bit 162 and enable bit 164 in the disable state and causing the processor to switch back to the user mode, the states of enable bit 152 and enable bit 154 are selected for the user mode (see step 250 of FIG. 2). The programmer would then cause the processor to execute the routine to be debugged. Since enable bit 152 and enable bit 154 are stored in the disable state, debug events are not recognized during execution in the user mode. However, since enable bit 182 and/or enable bit 184 are stored in the enable state, the selected debug event(s) are recognized during the execution of handlers in the kernel mode. In this manner, the performance of debugging operating system routines is improved by avoiding the unnecessary recognition and servicing of branch breakpoint events during execution in the user mode. In addition, performance is improved by allowing the processor to execute in the superscalar mode during execution in the user mode.

Furthermore, either a system or applications programmer may desire to enable debug events during execution of all software. For example, the programmer would do this to debug problems related to the interaction between handlers and applications. This would be accomplished in a manner similar to that described above.

While this embodiment is described in relation to branch breakpoint events and address breakpoint events, storing a bit for identifying whether certain circuitry should be enabled during the servicing of an event could be implemented for any number of events and any number of different circuits. In addition, while this embodiment describes a computer system in which the enablement of the debug events depends on the current state of the enable bits in status register 150 and these enable bits are altered upon entering and exiting the kernel mode, alternative embodiments can use any number of techniques to provide separate indications for separately selecting the enablement of debug events in different modes. For example, an alterative embodiment can have one register in which all of the enable bits are stored and could have circuitry which chooses which bits in that register are currently used based on the current mode of the processor. Furthermore, while the flow diagram in FIG. 2 describes the situation where a process executing in the user mode is interrupted to execute a handler in the kernel mode, handlers could also be interrupted by the recognition of another event (referred to herein as a secondary handler) to execute a another handler (referred to herein as a secondary handler). In such a case, the processor typically remains in the kernel mode until it has completed the execution of both handlers and returns to executing the suspended process.

Single Stepping

Overview

Figure 3:
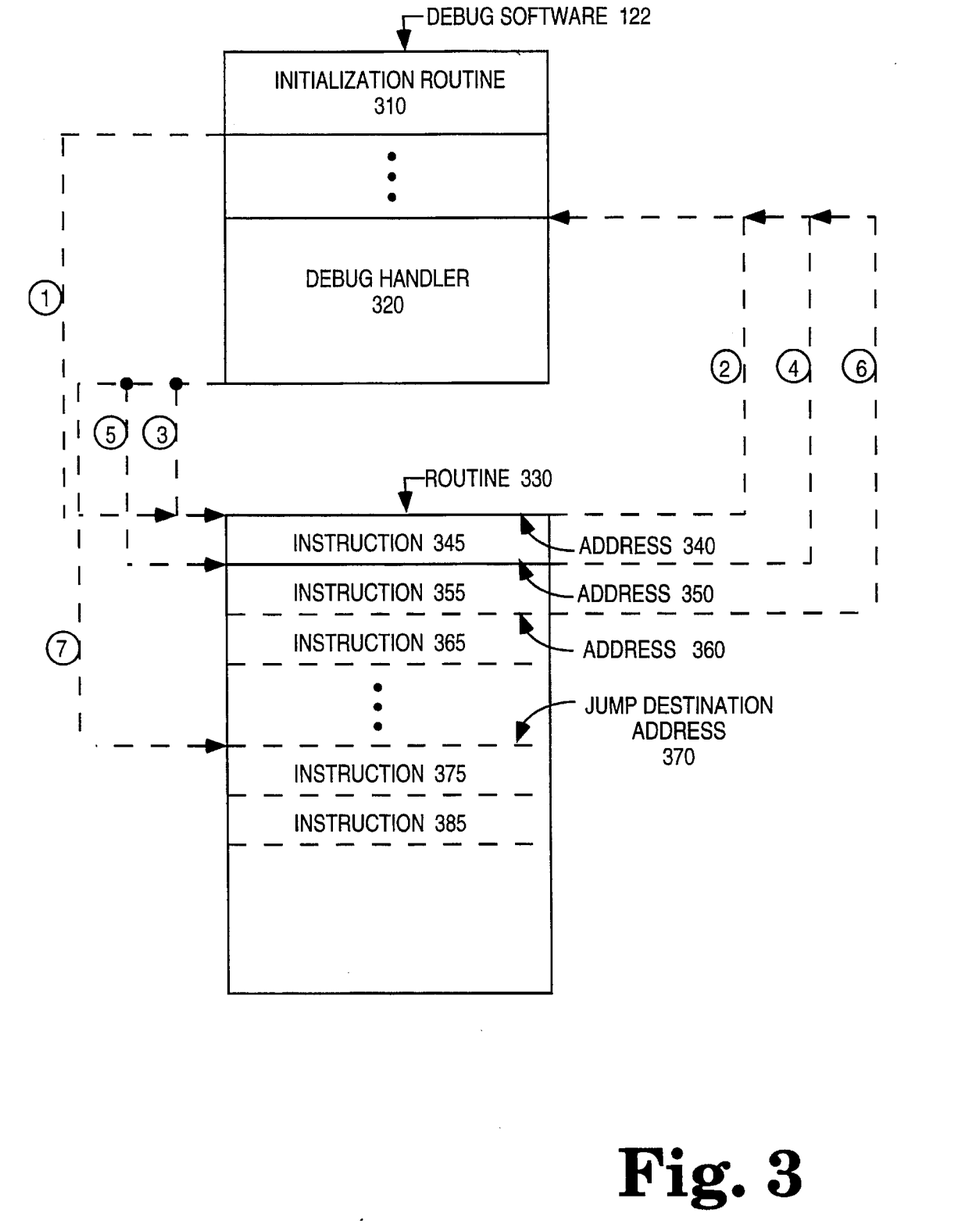
FIG. 3 illustrates single stepping according to one embodiment of the present invention.

FIG. 3 illustrates single stepping according to one embodiment of the present invention. FIG. 3 shows a routine 330 to be single stepped. Routine 330 includes an instruction 345, an instruction 355, an instruction 365, an instruction 375, and an instruction 385. Instructions 345, 355, and 365 are in sequential order. However, instruction 375 does not sequentially follow instruction 365. Instruction 385 sequentially follows instruction 375.

To perform single stepping, an address breakpoint is stored to cause an address breakpoint event at address 350 (i.e., the address of instruction 355). In addition, branch breakpoint events are enabled. Assuming the processor is currently executing instruction 345, the address breakpoint will cause the debug handler to be executed if flow of execution sequentially passes to instruction 355. However, if instruction 345 causes the processor to branch to instruction 375, a branch breakpoint event will cause the debug handler to be executed. In response to either the address breakpoint event or the branch breakpoint event, the debug handler updates the address breakpoint to cause a debug event to occur at the next sequential instruction in response to the address breakpoint event, the debug handler updates the address breakpoint to instruction 365; in response to the branch breakpoint event, the debug handler updates the address breakpoint to instruction 385.

Thus, the address breakpoint is used to cause a debug event upon the execution of each sequential instruction, while the branch breakpoints are used to cause a debug event when flow of execution branches. In this manner, single stepping is provided using branch breakpoints and address breakpoints. By providing both branch breakpoints and address breakpoints the invention provides for greater flexibility over prior art processors. For example, the programmer can use branch breakpoints, address breakpoint, or both branch breakpoints and address breakpoints. Furthermore, by using the method described herein, the invention is capable of providing for single stepping without the complex circuitry required by prior art processors which provided a separate single stepping mode.

Further Description

FIG. 3 shows debug software 122 including initialization routine 310 and a debug handler 320. Assuming it is desired to single step routine 330, initialization routine 310 is executed.

Figure 4:
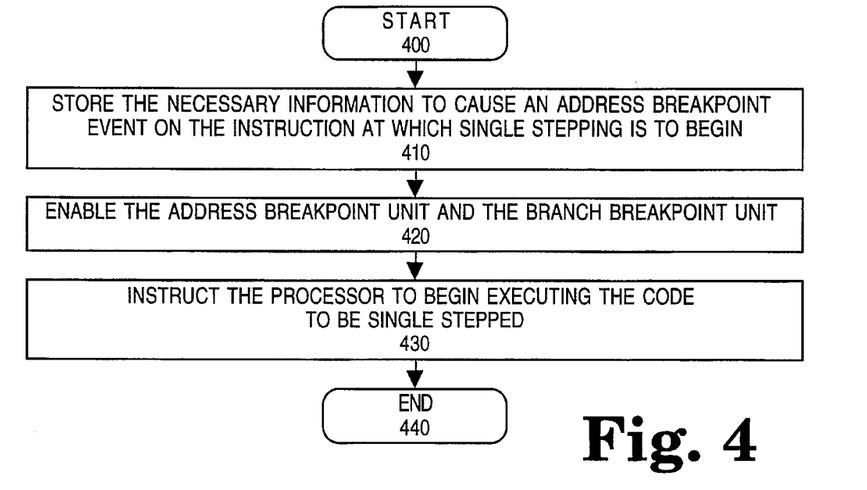
FIG. 4 illustrates a flow diagram of the operation of initialization routine 310 from FIG. 3 according to one embodiment of the invention.

FIG. 4 illustrates a flow diagram of the operation of initialization routine 310 from FIG. 3 according to one embodiment of the present invention. Initialization routine 310 is executed in the user mode. The flow diagram starts at step 400 from which flow passes to step 410.

As shown in step 410, the necessary information is stored to cause an address breakpoint event on the instruction in which single stepping is to begin. From step 410, flow passes to step 420. In the example shown in FIG. 4, it is desired to have single stepping begin at the first instruction of routine 330 (i.e., instruction 345). Since instruction 345 corresponds to address 340, initialization routine 310 stores the necessary information to cause an address breakpoint event at address 340. Thus, initialization routine 310: 1) stores the information in address breakpoint unit 194 to define an address range which includes address 340; 2) stores type bits 186 to indicate that address range is an instruction address range; and 3) stores enable bits 188 to enable that address range.

At step 420, the address breakpoint unit and the branch breakpoint unit are enabled. From step 420, flow passes to step 430. In the embodiment shown in FIG. 1, initialization routine 310 causes processor 110 to the processor to: 1) switch to the kernel mode; 2) store enable bit 162 and enable bit 164 in the enable state; and 3) switch back to the user mode. By storing enable bit 162 and enable bit 164 in the enable state and causing the processor to switch back to the user mode, the states of enable bit 152 and enable bit 154 are selected for the user mode (see step 250 of FIG. 2). Based on whether it is desired to enable debug events during the execution of handlers, initialization routine 310 would also alter enable bit 182 and enable bit 184 to the appropriate state.

At step 430, the initialization routine instructs the processor to begin executing at the starting address of the code to be single stepped and flow passes to step 440. In the example shown in FIG. 3, initialization routine 310 instructs the processor to begin executing at the starting address of routine 430 (address 340) as shown by line 1.

At step 440, the flow diagram ends. In the example shown in FIG. 3, the processor begins executing at instruction 345.

Upon attempting to execute instruction 345, processor 110 will recognize an address breakpoint event—i.e., address breakpoint unit 194 will receive address 340, determine address 340 falls within the address range stored in step 410, and transmit a signal indicating as such to execution unit 142; in response to this signal, execution unit 142 will recognize an address breakpoint event. In response to recognizing this address breakpoint event, the processor begins performing the steps shown in FIG. 2 starting at step 200. The steps in this flow diagram will be performed as previously described. At step 240 ("execution of the appropriate handler"), debug handler 320 is executed. This is shown by line 2 in FIG. 3.

Figure 5:
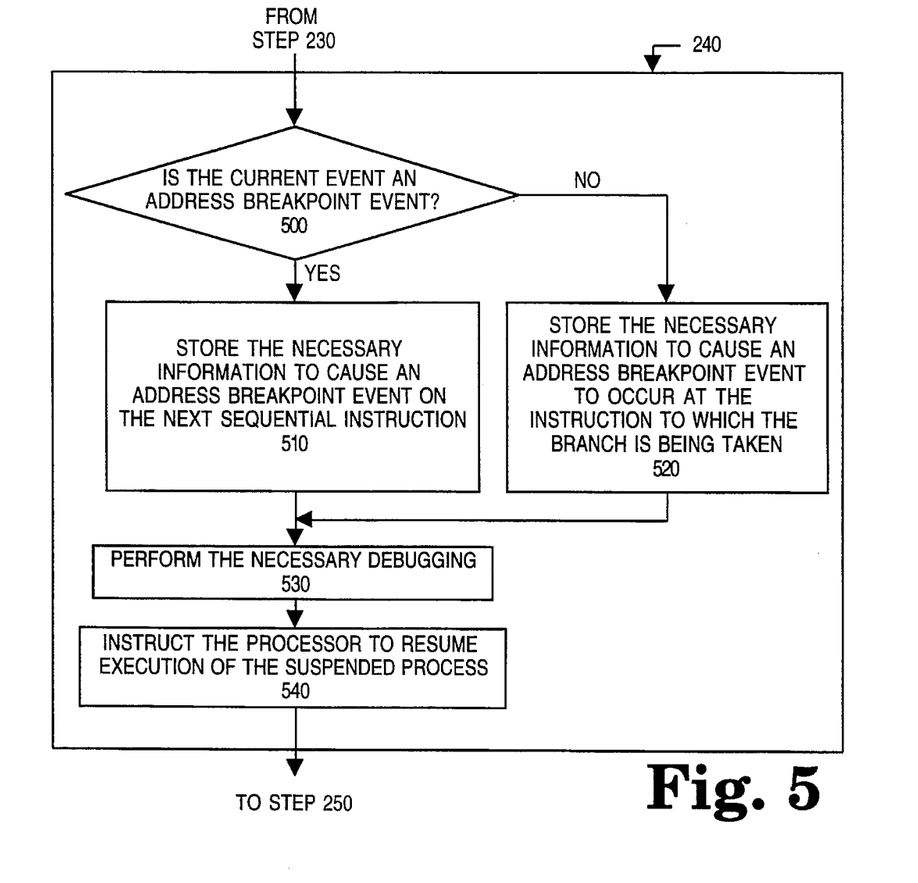
FIG. 5 illustrates a flow diagram of the operation of debug handler 320 from FIG. 3 according to one embodiment of the present invention.

FIG. 5 illustrates a flow diagram of the operation of debug handler 320 from FIG. 3 according to one embodiment of the present invention. Flow passes from step 230 in FIG. 2 to step 500 in FIG. 5.

At step 500, it is determined whether the current event is an address breakpoint event. If the current event is an address breakpoint event, flow passes to step 510. Otherwise, flow passes to step 520. In the described embodiment, debug handler 320 is a generic debug handler which services both address breakpoint events and branch breakpoint events. Debug handler 320 determines whether an address breakpoint event has occurred by accessing the event status register as previously described. In the present example, the current event is an address breakpoint event and flow passes to step 510.

At step 510, the necessary information is stored to cause an address breakpoint event on the next sequential instruction and flow passes to step 530. In the example shown in FIG. 3, instruction 355 sequentially follows instruction 345. Thus, debug handler 320 stores the necessary information to cause an address breakpoint event at address 350.

At step 530, the necessary debugging is performed and flow passes to step 540.

As shown in step 540, the debug handler instructs the processor to resume execution of the suspended process and flow passes to step 250.

Upon completing the remaining steps in FIG. 2, the processor resumes execution of the suspended process. Thus, in the example shown in FIG. 3, the processor resumes execution starting at instruction 345 as shown by line 3. To avoid recognizing another address breakpoint at instruction 345, a flag similar manner to the resume flag used in the Pentium processor may be used. Upon completing execution of instruction 345, the flow of execution will pass to instruction 355. Because of the steps performed in step 510 (storing the necessary information to cause an address breakpoint event at address 350), another address breakpoint event will occur at instruction 355. As previously described, the steps shown in FIG. 2 will be performed upon recognition of this second address breakpoint event. As a result, debug handler 320 will again be executed in step 500 as shown in FIG. 3 by line 4. During the execution of debug handler 320 as shown by FIG. 5, the necessary information to cause an address breakpoint event on instruction 365 (i.e., the instruction sequentially following instruction 355) is stored in step 510. Upon completing the remaining steps in FIG. 5 and FIG. 2, the processor again resumes execution of the suspended process. Thus, in the example shown in FIG. 3, the processor resumes execution starting at jump instruction 355 as shown by line 5.

In the present example, it is assumed that instruction 355 instructs the processor to jump to jump destination address 370. As a result, when the processor attempts to execute instruction 355, a branch breakpoint event is recognized. In response to this branch breakpoint event, the steps described with reference to FIG. 2 are again performed. Thus, debug handler 320 will again be executed in step 240 as shown by line 6 in FIG. 3.

Referring again to FIG. 5, flow passes from step 230 in FIG. 2 to step 500 in FIG. 5.

At step 500, it is determined whether the current event is an address breakpoint event. If the current event is an address breakpoint event, flow passes to step 510. Otherwise, flow passes to step 520. In the present example, the current event is a branch breakpoint event and flow passes to step 520, rather than step 510.

As shown in step 520, the necessary information is stored to cause an address breakpoint event to occur at the instruction to which the branch is taken. From step 520, flow passes to step 530. In the present example, instruction 355 instructs the processor to branch to instruction 375. Thus, the necessary information is stored to cause an instruction address breakpoint event to occur at instruction 375.

At step 530, the necessary debugging is performed and flow passes to step 540.

As shown in step 540, the debug handler instructs the processor to resume execution of the suspended process and flow passes to step 250.

Upon completing the remaining steps in FIG. 2, the processor resumes execution of the suspended process. Thus, in the example shown in FIG. 3, the processor resumes execution starting at instruction 375 as shown by line 7.

Alternative Embodiments

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A processor operable in a first mode and a second mode said processor comprising:

a first storage area configured to store a first indication indicating which of said first mode and said second mode said processor is currently operating in; and a circuit configured to store a second indication and a third indication, said second indication for indicating whether a debug event is to be recognized while said processor is operating in said first mode, said third indication for indicating whether said debug event is to be recognized while said processor is operating in said second mode; and a debug circuitry coupled to said first storage area to receive said first indication, said debug circuitry coupled to said circuit to receive one of said second indication and said third indication as a current indication based on said first indication, said debug circuitry allowing recognition of said debug event based on said current indication.

2. The processor of claim 1, said circuit comprising:

a second storage area configured to store said second indication;

a third storage area configured to store said third indication; and a fourth storage area configured to store one of said second indication and said third indication as said current indication based on which of said first mode and said second mode said processor is currently operating.

3. The processor of claim 2 further comprising:

a control unit coupled to said third storage area for copying said third indication into said fourth storage area in response to said processor switching to said second mode.

4. The processor of claim 2 further comprising:

an execution unit for copying said second indication into said fourth storage area in response to said processor switching to said first mode.

5. The processor of claim 1, wherein said first mode is a kernel mode for executing operating system routines, and wherein said second mode is a user mode for executing applications.

6. The processor of claim 1, said debug circuitry including a branch breakpoint unit.

7. The processor of claim 1, said debug circuitry including an address breakpoint unit.

8. The processor of claim 1, said processor having a scalar mode and a superscalar mode, said processor operating in said scalar mode while said current indication indicates said debug event is to be recognized.

9. An apparatus for use in a computer system, said apparatus comprising:

a first storage area to store a first indication, said first indication for enabling a debug circuitry during execution of non-operating system routines;

a second storage area to store a second indication, said second indication for enabling said debug circuitry during execution of operating system routines;

a third storage area to store one of said first indication and said second indication as a current indication;

a control unit coupled to said second storage area to copy said second indication into said third storage area during the execution of operating system routines; and said debug circuitry coupled to said third storage area to receive said current indication.

10. The apparatus of claim 9 further comprising:

an execution unit coupled to said first storage area to copy said first indication into said third storage area during the execution of non-operating system routines.

11. The apparatus of claim 9, said debug circuitry providing branch breakpoints.

12. The apparatus of claim 9, said debug circuitry providing address breakpoints.

13. The apparatus of claim 9, said debug circuitry providing both a break on jump breakpoint and an address breakpoint, both said first indication and said second indication allowing for separate enablement of said break on jump breakpoint and said address breakpoint.

14. A processor operable in a first mode and a second mode, said processor comprising:

an execution unit;

a circuit means for selectively enabling recognition of a debug event while said processor is operating in said first mode and for separately allowing for selectively enabling recognition of said debug event while said processor is operating in said second mode, said first mode allowing access to storage areas and execution of instructions not available in said second mode; and a debug circuitry coupled to said circuit means for recognizing said debug event.

15. The processor of claim 14, said circuit means comprising:

a first storage area for storing an indication for indicating whether recognition of said debug event is enabled.

16. The processor of claim 15, said indication having a first state for enabling recognition of said debug event and a second state for disabling recognition of said debug event, said circuit means further including a control unit coupled to said first storage area, said control unit for altering said indication to one of said first state and said second state based on which of said first mode and said second mode said processor is operating in.

17. The processor of claim 14, said first mode for executing operating system type routines, said second mode for executing application type routines.

18. The processor of claim 14, said debug event being a branch breakpoint event.

19. The processor of claim 14, said debug event being an address breakpoint event.

20. The processor of claim 14, said processor having a scalar mode and a superscalar mode, said processor operating in said scalar mode while recognition of said debug event is enabled.

21. The processor of claim 14, wherein switching between said first mode and said second mode may be performed during software task switches.

22. In a computer system having a processor, said processor operable in a first mode and a second mode, a method for separately enabling recognition of a debug event in said first mode and said second mode, said method comprising the steps of:

A) storing a first indication for selectively enabling recognition of said debug event while said processor is in said first mode;

B) storing a second indication for selectively enabling recognition of said debug event while said processor is in said second mode;

C) selecting one of said first indication and said second indication as a currently selected indication based on which of said first mode and said second mode said processor is currently operating in; and D) enabling recognition of said debug event based on said currently selected indication.

23. The method of claim 22, said step of selecting further comprising the steps of:

C1) storing said second indication in a current indication storage area in response to said processor switching to said second mode; and C2) storing said first indication in said current indication storage area in response to said processor switching to said first mode.

24. The method of claim 22, wherein said debug event is a branch breakpoint event.

25. In a computer system having a processor, a method for separately enabling recognition of a debug event, said method comprising the steps of:

A) enabling recognition of said debug event based on a first indication while said processor is executing non-operating system routines, said first indication indicating one of an enable state and a disable state; and B) enabling recognition of said debug event based on a second indication while said processor is executing operating system routines, said second indication indicating one of said enable state and said disable state.

26. The method of claim 25, said step of enabling recognition of said debug event based on said first indication further comprising the steps of:

A1) storing said first indication in a current indication storage area.

27. The method of claim 26, said step of enabling recognition of said debug event based on said second indication further comprising the steps of:

B1) storing said second indication in a second indication storage area;

B2) copying said first indication from said current indication storage area into a first indication storage area in response to said processor switching to executing operating system routines; and B3) copying said second indication from said second indication storage area into said current indication storage area in response to step B2.

28. The method of claim 27, said step of enabling recognition of said debug event based on said first indication further comprising the step of:

A2) copying said first indication from said first indication storage area into said current indication storage area in response to said processor switching to executing non-operating system routines.

29. The method of claim 25 further comprising the steps of:

C) detecting an occurrence of said debug event;

D) determining whether recognition of said debug event is enabled; and

E) recognizing said occurrence of said debug event if it was determined recognition of said debug event is enabled.

30. The method of claim 29, said step of determining whether recognition of said debug event is enabled further comprising the steps of:

D1) accessing a currently selected indication in a current indication storage area, said currently selecting indication being one of said first indication and second indication; and D2) determining whether recognition of said debug event is enabled based on said currently selected indication.

31. A computer system comprising:

a bus;

a processor, coupled to said bus, operable in a first mode and a second mode, said processor comprising:

a first storage area configured to store a first indication indicating which of said first mode and said second mode said processor is currently operating in; and a circuit configured to store a second indication and a third indication, said second indication for indicating whether a debug event is to be recognized while said processor is operating in said first mode, said third indication for indicating whether said debug event is to be recognized while said processor is operating in said second mode; and a debug circuitry coupled to said first storage area to receive said first indication, said debug circuitry coupled to said circuit to receive one of said second indication and said third indication as a current indication based on said first indication, said debug circuitry allowing recognition of said debug event based on said current indication; and a memory, coupled to said bus, having stored therein a routine which, when executed by said processor, causes said processor to alter one of said second and said third indications.

32. The computer system of claim 31, wherein said first mode is for executing operating system type routines, and said second mode is for executing non-operating system type routines.

33. The computer system of claim 31, wherein said debug event is a branch breakpoint event.

34. The computer system of claim 31, wherein said debug event is an address breakpoint event.

* * * * *

UNITED STATES PATENT AND TRADEMARK OFFICE
CERTIFICATE OF CORRECTION

PATENT NO.   :   5,621,886
DATED        :   April 15, 1997
INVENTOR(S)  :   Alpert et al.

It is certified that error appears in the above-identified patent and that said Letters Patent is hereby corrected as shown below:

In column 4 at line 5 insert --processor-- following "Pentium" and prior to "is"

In column 4 at line 42 delete "invention, In the drawings." and insert --invention.  In the drawings:--

In column 10 at line 5 delete "system"

In column 11 at line 17 delete "alterative" and insert --alternative--

Signed and Sealed this

Twelfth Day of August, 1997

Attest:

BRUCE LEHMAN

*Attesting Officer*        *Commissioner of Patents and Trademarks*